Sept. 7, 1948.  H. W. LAURANCE  2,448,533
CONSISTENCY METER
Filed June 18, 1946
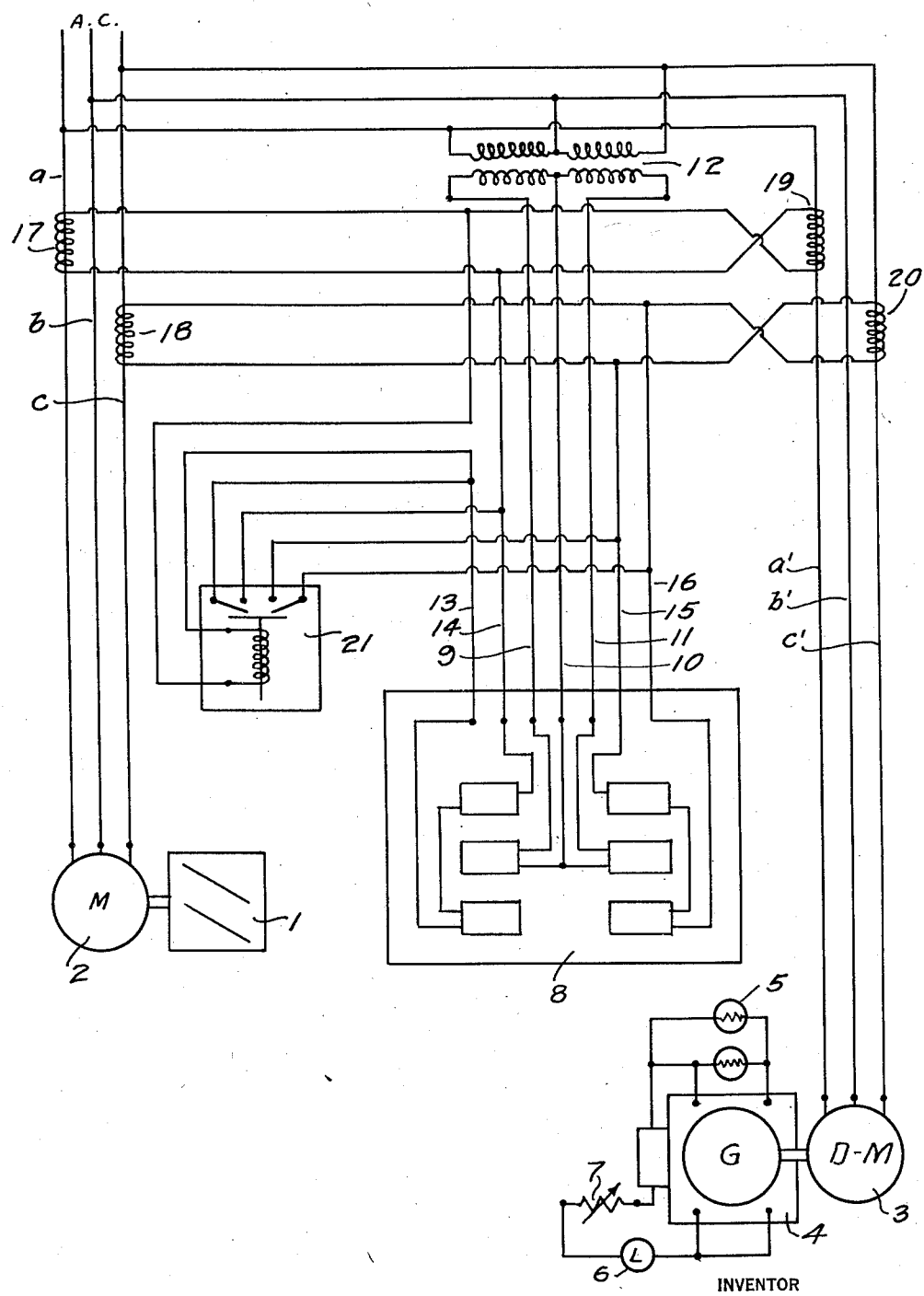
INVENTOR
HAROLD W. LAURANCE
BY
*J. T. Mothershead*
ATTORNEY Patented Sept. 7, 1948

2,448,533

UNITED STATES PATENT OFFICE 2,448,533

CONSISTENCY METER

Harold Warren Laurance, Coulee Dam, Wash.

Application June 18, 1946, Serial No. 677,472

1 Claim. (Cl. 73—54)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928, (Ch. 460, 45 Stat. L. 467).

This invention relates to consistency meters or indicators, and more specifically, to such a device for indicating the consistency of a concrete mixture or similar mixture.

Heretofore the control of concrete manufacture has been maintained by periodic tests on the mixes and by various devices to indicate the relative slump of the mix. The relative slump is not always a reliable indication of the workability of the concrete and consequently a more dependable method is needed.

It has been proposed to measure the consistency or workability of a mixture of concrete as a function of the energy or power consumed, or of a component of the power consumed by the prime mover operating the mixer. The most convenient method involves the use of a wattmeter to measure the power input where the prime mover is an electric motor. The use of a wattmeter has proved to be unreliable since the meter indication is affected by factors other than changes in the conditions of the mix. Other conditions which cause variations in power input include changes in efficiency of the motor due to initial warm-up, ambient temperature, temperature changes due to variations in the frequency of the mixes and voltage and frequency variations in the power supply.

This invention has for an object the provision of a consistency indicator which is substantially responsive only to variations in the mix itself.

Another object is the provision of an indicator which can be readily adjusted for different mixtures. Other objects and advantages of my invention will be apparent from the description hereinafter given.

This invention, while it is primarily intended to be used in conjunction with power-driven concrete mixers, may also be used wherever it is desirable or necessary to control the consistency of a mixture, for example, mixtures of baking batters, etc.

In carrying out the invention, the power input to the mixer motor is balanced by means of a differential circuit, against the power input to a reference motor having operating characteristics similar to those of the mixer motor. The difference between the two inputs is fed to a suitable indicator, for example, a wattmeter. The reference motor is burdened with a controllable load which may be varied so that when the mixer is charged with a mix of proper consistency the indicator gives a predetermined reading. Thereafter, when mixes are being made, the indicator shows any variations from standard. When mixes of a different consistency are desired, the reference motor load is again adjusted. Any variations in load due to changes in the power line or to temperature, etc., occur equally in both motor circuits and have no effect on the indicator reading.

While any type of differential may be employed, in describing my invention, reference will be made to the accompanying drawing which illustrates the preferred form of my invention.

In the drawing, the figure is a schematic wiring diagram of a form of my invention in which a three-phase power supply and a poly-phase wattmeter are employed.

Referring to the drawing, in which similar reference characters designate corresponding parts, 1 represents a mixing machine, for example, a concrete mixer which is driven by motor 2. Motor 2 may be any suitable type, but is here illustrated as a three-phase A. C. motor receiving its power supply over supply lines $a$, $b$, and $c$. In order to eliminate the effect on the indicating device of changes in load resulting from heating of motor 2, due to frequent mixes in mixer 1, as well as changes due to variations in ambient temperature, a second motor 3, having characteristics similar to motor 2, is employed. That is, the slip as indicated by the R. P. M. and the efficiency as indicated by the temperature rise rating should be comparable. Motor 3, which preferably has a much lower horsepower rating, derives its current supply through conductors $a^1$, $b^1$, $c^1$ from the same power source as motor 2.

The differential motor 3 is loaded by a small generator which, if not of the permanent magnet type, has a regulating tube 5 to limit variations in generator voltage due to heating of the field and to changes in ambient temperature. The generator is loaded with an adjustable load, for example, lamp 6 and rheostat 7, the latter being capable of adjustment for small increments.

While any suitable indicating means may be employed, I prefer to use a polyphase wattmeter 8 having an "0" center scale. The potential windings of the meter are connected through conductors 9, 10 and 11 to potential transformer bank 12. The current windings are connected through conductors 13, 14, 15 and 16 to a differential current circuit comprising current transformers 17, 18, 19 and 20.

A simple current relay 21 is connected to shunt out the meter windings during initial charging and empty periods.

The differential meter operates as follows:

When a batch of concrete or other material has reached a desired consistency, in the mixer, the loading rheostat 7 for the generator 4 is adjusted until the meter 8 reads "0." Thereafter, when making subsequent mixes, any variations from "0" indicate changes in the batch. With the consistency meter one can readily determine the effect upon the mix of variations in the condition of the aggregates so that with experience one can pre-set the control rheostat while batch materials are being measured or weighed out.

The sensitivity of the instrument is determined by selection of the current transformers in the respective motor leads. As the current through the wattmeter is zero or very nearly so while mixing, it is possible to use current transformers with high secondary currents. Thus, small variations will register substantial changes on the wattmeter.

It will be obvious that changes may be made in the application of the underlying principles of my invention and that my invention is not limited to the details shown, but that other means may be employed without departing from the spirit thereof, for example, means to measure the torque input to the mixer and reference loads. This could be accomplished by electrical, mechanical or hydraulic means.

Having described the invention, what is claimed is:

In a device for determining the consistency of a batch of concrete or the like being mixed in a mixing machine driven by an electric motor, a second motor having electrical characteristics similar to those of the mixer motor, a controllable load for said second motor, a potential transformer bank connected in the power line to the two motors, a current transformer in the power line to the mixer motor, a current transformer in the power line to the said second motor, a circuit for balancing the secondary currents of said current transformers, a wattmeter having its potential windings connected to said potential transformer and its current windings connected to said circuit, for indicating any difference in the said secondary currents.

HAROLD WARREN LAURANCE.

REFERENCES CITED

The following references are of record in the file of this patent:

UNITED STATES PATENTS

| Number | Name | Date |
|---|---|---|
| 1,942,920 | Fawkes | Jan. 9, 1934 |
| 2,206,416 | Mathes | July 2, 1940 |
| 2,280,947 | Gulliksen | Apr. 28, 1942 |